(12) United States Patent
Ahmad

(10) Patent No.: US 11,713,981 B2
(45) Date of Patent: Aug. 1, 2023

(54) MAGNETOSTRICTIVE DISPLACEMENT SENSOR

(71) Applicant: SICK ATech GmbH, Witten (DE)

(72) Inventor: Saiful Islam Ahmad, Witten (DE)

(73) Assignee: SICK ATECH GMBH, Witten (DE)

( * ) Notice: Subject to any disclaimer, the term of this patent is extended or adjusted under 35 U.S.C. 154(b) by 0 days.

(21) Appl. No.: 17/506,763

(22) Filed: Oct. 21, 2021

(65) Prior Publication Data

US 2022/0136864 A1    May 5, 2022

(30) Foreign Application Priority Data

Nov. 3, 2020    (EP) ..................................... 20205522

(51) Int. Cl.
*G01D 5/14* (2006.01)
(52) U.S. Cl.
CPC ..................... *G01D 5/14* (2013.01)
(58) Field of Classification Search
CPC ....................................................... G01D 5/14
See application file for complete search history.

(56) References Cited

U.S. PATENT DOCUMENTS

| | | | |
|---|---|---|---|
| 4,678,993 A | 7/1987 | Vinnemann et al. | |
| 5,258,707 A * | 11/1993 | Begin | G01B 7/02 324/207.13 |
| 5,274,328 A * | 12/1993 | Begin | G01D 5/485 324/207.13 |
| 5,406,200 A * | 4/1995 | Begin | G01B 7/003 324/207.13 |
| 5,998,991 A * | 12/1999 | Begin | G01F 23/72 324/207.13 |
| 2005/0114053 A1* | 5/2005 | Southward | G01R 29/02 702/66 |
| 2020/0025594 A1 | 1/2020 | Kantor et al. | |

(Continued)

FOREIGN PATENT DOCUMENTS

DE         3131455 A1    3/1983
DE    202006012815 U1    1/2008

(Continued)

OTHER PUBLICATIONS

European Search Report dated Mar. 23, 2021 corresponding to application No. 20205522.4-1010.

*Primary Examiner* — Walter L Lindsay, Jr.
*Assistant Examiner* — Milton Gonzalez
(74) *Attorney, Agent, or Firm* — Nath, Goldberg & Meyer; Jerald L. Meyer

(57) ABSTRACT

An evaluation unit for a magnetostrictive displacement sensor and a magnetostrictive displacement sensor for determining a position of at least one position encoder having an input for receiving an electrical measurement signal generated by the magnetostrictive displacement sensor are proposed. The electrical measurement signal includes a position signal representing a position of a position encoder movable relative to a magnetostrictive device component and a reference signal representing a reference position, having a first evaluation branch for evaluating the measurement signal. The first evaluation branch is adapted to determine a position signal time of flight of the position signal and a first reference signal time of flight of the reference signal.

14 Claims, 4 Drawing Sheets

(56) References Cited

U.S. PATENT DOCUMENTS

| | | | | |
|---|---|---|---|---|
| 2020/0263710 A1* | 8/2020 | Grahl | .................... | G01D 11/30 |
| 2021/0231468 A1* | 7/2021 | Kraehe | ................. | G01N 29/46 |
| 2022/0120621 A1* | 4/2022 | Baluja | .................... | G01F 23/80 |

FOREIGN PATENT DOCUMENTS

| | | | | |
|---|---|---|---|---|
| DE | 102007031787 A1 * | 1/2009 | .............. | G01B 7/02 |
| DE | 102017111342 B3 | 10/2018 | | |
| DE | 102018117285 A1 | 1/2020 | | |
| EP | 0882212 B1 | 7/2005 | | |

* cited by examiner

MAGNETOSTRICTIVE DISPLACEMENT SENSOR

FIELD

The present invention relates to a control and evaluation unit for a magnetostrictive displacement sensor and to a magnetostrictive displacement sensor having a magnetostrictive device component that extends along a measurement path and that is configured for conducting structure-borne sound waves triggered by magnetostriction.

BACKGROUND

Such sensors are disclosed, for example, in DE 31 31 455 A1 and are in particular used in industrial metrology to measure positions, length, or distances covered. The magnetostrictive device component can be a thin rod, a wire, or a tube of a ferromagnetic material such as iron, nickel, or cobalt that can be a few centimeters up to several meters long, for example. A so-called "position magnet", for example in the form of a permanent magnet, that generates a magnetic field in the magnetostrictive device component is typically attached to the component whose position is to be detected. The position magnet can, for example, be of ring shape and can surround the magnetostrictive device component. When an electrical current pulse is passed through the magnetostrictive device component, a further time variable and spatially variable magnetic field is generated in the environment of the magnetostrictive device component in addition to the magnetic field generated by the position magnet. A mechanical pulse such as a mechanical longitudinal pulse and/or torsion pulse that moves along the measurement path in the form of a structure-borne sound wave can be generated in the magnetostrictive device component by interaction of the two magnetic fields at the location of the position magnet. A transducer of the displacement sensor typically serves to convert the mechanical structure-borne sound waves conducted by the magnetostrictive device component into electrical measurement signals. The transducer can, for example, comprise a coil or a piezoelectric measurement element. The transducer can, for example, be designed as described in EP 0 882 212 B1. The position of the position magnet can ultimately be determined by a time of flight measurement between the current pulse and the detection of the structure-borne sound wave. Displacement sensors based on the magnetostrictive measurement principle work contactlessly and deliver absolute values. While taking account of thermal coefficients and mechanical tolerances, they as a rule do not require any recalibration and are also suitable for adverse operating conditions. They are frequently designed as linear displacement sensors. A use of such sensors within hydraulic cylinders to detect their piston position is described, for example, in DE 20 2006 012 815 U1.

The described longitudinal or torsion pulses move in both directions away from the position of the position magnet in the magnetostrictive device component. They are detected with the aid of the transducer at the one end of the magnetostrictive device component to determine the current position of the position magnet along the magnetostrictive device component using the described time of flight measurement. At the other end, a damper unit is used as a rule to prevent the pulse from being reflected and propagating back along the magnetostrictive device component since this can interfere with the detection of the pulse running directly in the direction of the transducer or can make it ambiguous.

It is known from the initially named DE 31 31 455 A1 to compensate temperature dependent variations of the structure-borne sound propagation and length variations of the magnetostrictive device component and variations of electrical parameters of the evaluation circuit with respect to their influence on the position determination of the position magnet. In this process, a reference signal is used that originates, for example, from a further spatially fixed position magnet or from a non-damped end of the magnetostrictive device component.

It is disadvantageous in said prior art that the signal evaluation only takes place to improve the position determination and in one single evaluation branch of an evaluation circuit. A redundant check of the position signals within the evaluation circuit, such as is necessary in safety critical applications, is therefore not possible.

SUMMARY

It is therefore an object of the invention to provide an evaluation unit for a magnetostrictive displacement sensor that enables a constant diagnosis of the sensor function and of the quality of the measurements. It is furthermore an object of the invention to provide an improved magnetostrictive displacement sensor having an at least partially redundant monitoring of at least one position signal.

An evaluation unit in accordance with the invention for the determination of a position of at least one position encoder has an input for receiving an electrical measurement signal that is generated by the magnetostrictive displacement sensor and that was generated as a response of a magnetostrictive device component of the displacement sensor to a current pulse. The electrical measurement signal can, for example, be an oscillating voltage with a variable voltage amplitude and can include a position signal that represents a position of a position encoder movable relative to the magnetostrictive device component and a reference signal representing a reference position. The reference signal can here originate from different sources, as will be explained further below.

The evaluation unit furthermore has a first evaluation branch for evaluating the measurement signal, with the first evaluation branch being adapted to determine a position signal time of flight of the position signal and a first reference signal time of flight of the reference signal. The determination of the signal times of flight can take place, for example, in that the emission of the current pulse to the magnetostrictive device component of the magnetostrictive displacement sensor starts a counter that is respectively read on the detection of the position signal and of the reference signal, with the read counts each representing a position signal time of flight and a first reference signal time of flight.

A processor unit connected downstream of the first evaluation branch is adapted to receive the position signal time of flight and the first reference signal time of flight and to determine a position of the position encoder from the determined position signal time of flight. The position signal time of flight and/or the reference signal time of flight in the sense of this application should here comprise both the signal times of flight themselves and the signals representing them, inter alia, for example, the aforesaid counts.

The time of flight determination and/or the position determination in a magnetostrictive displacement sensor is known from the prior art and is generally familiar to the skilled person so that a detailed description of the underlying electronic signal processing that can take place in both a digital and an analog manner will be dispensed with at this point.

In accordance with the invention, the evaluation unit has a second evaluation branch that is adapted to determine a second reference signal time of flight of the reference signal. The second reference signal time of flight can be determined in the second evaluation branch in the same manner as in the first evaluation branch, with the emission of the current pulse to the magnetostrictive device component of the magnetostrictive displacement sensor starting a second counter that is read on the detection of the reference signal, with the read count representing a second reference signal time of flight of the reference signal. Only that portion of the measurement signal is preferably evaluated in the second evaluation branch that includes the reference signal.

The processor unit is adapted to receive the second reference signal time of flight from the second evaluation branch and to determine a deviation from the first reference signal time of flight determined in the first evaluation branch.

The invention has the advantage that a simple monitoring of the signal processing and of the position determination is made possible in a magnetostrictive displacement sensor due to the use of two evaluation branches in one evaluation unit.

The processor unit can preferably be adapted to output an error signal on the basis of the deviation of the first reference signal time of flight from the second reference signal time of flight, for example when the deviation exceeds a predefined threshold value. A plurality of staged threshold values can likewise be provided. If the deviation of the times of flight exceeds a first threshold value, the processor unit can be adapted to first emit a warning signal that can, for example, include an indication of a servicing requirement of the displacement sensor. On an exceeding of a second, preferably higher, threshold value, an error signal can be output that can be used in a higher ranking safety controller, for example, for a shutting down or partial shutting down of a system that comprises the displacement sensor. The processor unit can moreover be adapted to output an error signal if no times of flight signals are received from one of the two evaluation branches.

The processor unit can further be adapted to determine the position of the position encoder while taking account of the first and/or second reference signal time(s) of flight. Length variations or variations of the speed of sound in the magnetostrictive device component, for example, can thereby be compensated on the basis of temperature fluctuations.

At least one of the counters for determining the signal times of flight can, for example, be started by a trigger signal of a pulse transmitter of the magnetorestrictive displacement sensor, with the pulse transmitter being adapted to emit at least one current pulse to a first end of the magnetostrictive device component. A unique signal to start the time of flight measurements is thus provided.

The evaluation unit can have at least one digitizing unit for digitizing the measurement signal, whereby a digital processing of the measurement signal is made possible. A common digitization unit can be provided for a plurality of evaluation branches, with the evaluation unit being adapted to distribute the measurement signal over the evaluation branches after the digitization. In an alternative embodiment, each evaluation branch can have a digitization unit.

In an embodiment, the second evaluation branch can be configured to compare the second reference signal time of flight with a predefined desired signal time of flight and to generate an error code on the basis of a deviation of the second reference signal time of flight from the desired signal time of flight. The fail-safeness of the evaluation unit is increased by the additional signal evaluation in the second evaluation branch.

The second evaluation branch can have its own interface for the analog or digital forwarding of the second reference signal time of flight and/or of the error code to an external receiver. The second reference signal time of flight and/or the error can there thereby be transmitted without deviation via the processor unit of the evaluation unit to external receivers such as a higher ranking controller.

A magnetostrictive displacement sensor in accordance with the invention for determining a position of at least one position encoder furthermore has a magnetostrictive device component that extends along a measurement path and that is configured to conduct mechanical pulses triggered by magnetostriction. A transducer is arranged in the region of a first end of the magnetostrictive device component that detects mechanical pulses propagating in the magnetostrictive device component and converts it into an electrical measurement signal. A pulse transmitter is adapted to emit at least one current pulse to the first end of the magnetostrictive device component, with the current pulse inducing a magnetic field in the magnetostrictive device component.

At least one first position encoder movable relative to the magnetostrictive device component triggers a mechanical pulse in the magnetostrictive device component as a response to the current pulse and the induced magnetic field, said mechanical pulse propagating in the magnetostrictive device component in the form of a structure-borne sound wave.

In an embodiment of the invention, the reference signal detected in the evaluation unit can be generated by a reflection of the first mechanical pulse at a second end of the magnetostrictive device component.

In a further embodiment of the invention, the reference signal detected in the evaluation unit can be generated by a second mechanical pulse that is triggered by a reference magnet arranged at a predefined distance from the first end of the magnetostrictive device component.

In an alternative embodiment of the invention, the reference signal detected in the evaluation unit can be generated in the transducer by the magnetic field that is induced by the current pulse and that directly generates a coupling signal in the transducer.

The method in accordance with the invention can be further developed in a similar manner and shows similar advantages in so doing. Such advantageous features are described in an exemplary, but not exclusive manner in the subordinate claims dependent on the independent claims.

BRIEF DESCRIPTION OF THE DRAWINGS

The invention will also be explained in the following with respect to further advantages and features with reference to the enclosed drawing and to embodiments. The Figures of the drawing show in.

DETAILED DESCRIPTION

Figure 1:
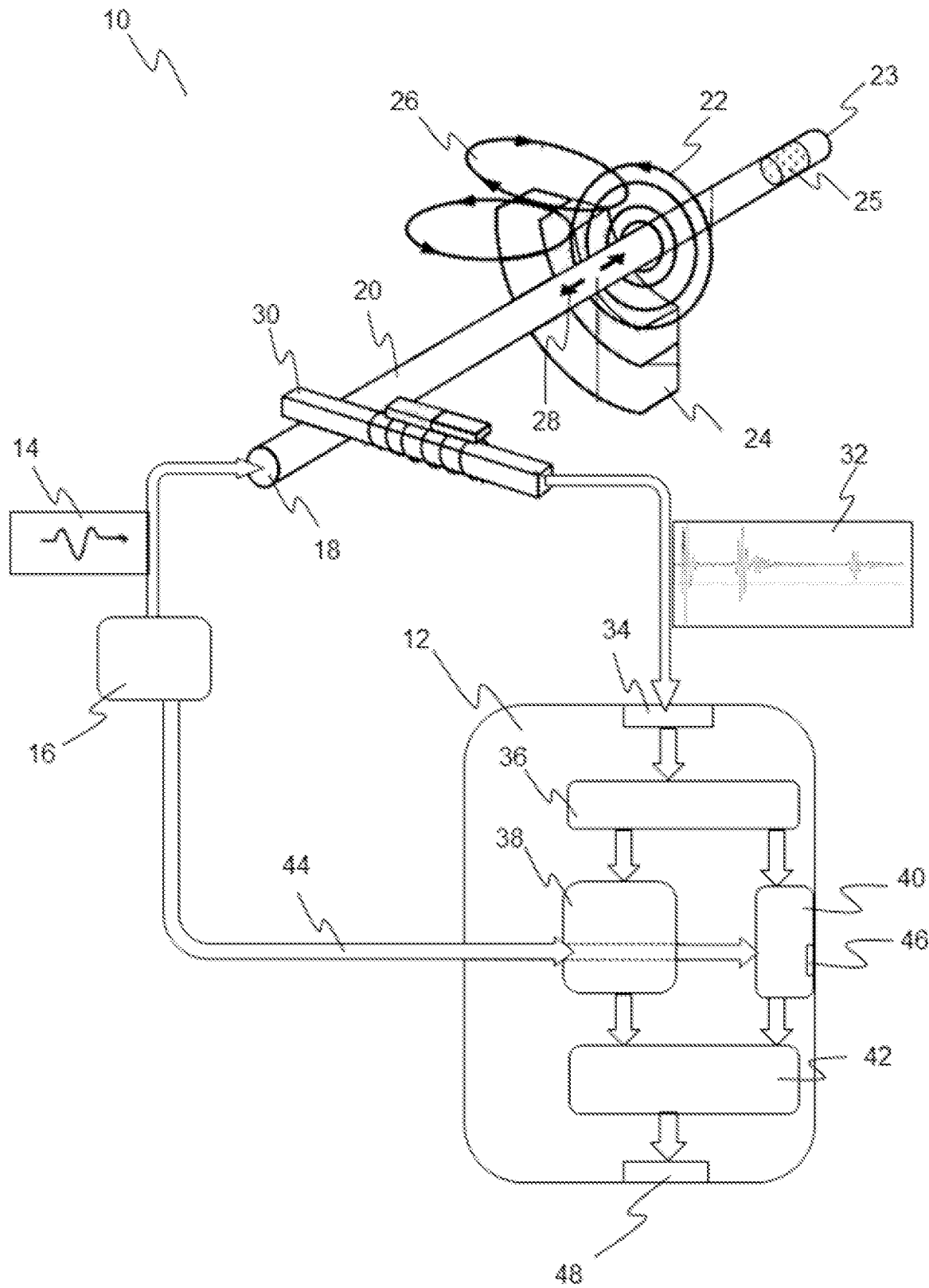
FIG. 1 a schematic representation of a magnetostrictive displacement sensor with an evaluation unit in accordance with the invention for a magnetostrictive displacement sensor.

FIG. 1 shows a schematic representation of a magnetostrictive displacement sensor 10 having an evaluation unit 12 in accordance with the invention for the magnetostrictive displacement sensor 10. A current pulse 14 is coupled by a pulse transmitter 16 into a first end 18 of a magnetostrictive device component 20 of the magnetostrictive displacement sensor 10 and generates a radial first magnetic field 22 that propagates along the magnetostrictive device component 20 in the direction of the second end 23 of the magnetostrictive device component 20. A position encoder 24 configured as a permanent magnet and movable relative to the magnetostrictive device component 20 generates a second magnetic field.

A mechanical pulse 28 in the form of a structure-borne sound wave is generated in the magnetostrictive device component 20 resulting from the interaction of the first magnetic field 22 and the second magnetic field 26.

The mechanical pulse 28 moves in the magnetostrictive device component 20 in both directions away from the position of the position encoder 24. In the region of the first end 18 of the magnetostrictive device component 20, the mechanical pulse 28 is detected by a transducer 30 that converts the mechanical pulse 28 into an electrical measurement signal 32. A damper unit 25 is arranged at the second end 23 of the magnetostrictive device component 20 to prevent or to reduce a reflection of the mechanical pulse 28 back into the magnetostrictive device component 20.

The evaluation unit 12 has an input 34 for receiving the electrical measurement signal 32 that, as will be explained further below in FIGS. 2 to 4, has at least one position signal and one reference signal. The electrical measurement signal 32 is digitized by a digitizing unit 36 and is evaluated in a first evaluation branch 38 and a second evaluation branch 40. The first evaluation branch 38 determines a position signal time of flight tP and a first reference signal time of flight tR1 that are received by a processor unit 42. The second evaluation branch 40 determines a second reference signal time of flight tR2 that is likewise received by the processor unit 42. The second evaluation branch 40 can compare the second reference signal time of flight tR2 with a predefined desired signal time of flight and can generate an error code on the basis of a deviation of the second reference signal time of flight tR2 from the desired signal time of flight. The second reference signal time of flight tR2 and/or the error code can be transferred in analog or digital form to an external receiver via an interface 48 of the second evaluation branch 40.

To determine the times of flight, the first evaluation branch 38 and the second evaluation branch 40 can be adapted to receive a trigger signal 44 from the pulse transmitter 16. The trigger signal 44 can be transmitted to the evaluation unit 12 by the pulse transmitter 16 on an emission of the current pulse 14 to the magnetostrictive device component 20.

The processor unit 42 is configured to receive the position signal time of flight $t_P$, the first reference signal time of flight $t_{R1}$, and the second reference signal time of flight $t_{R2}$ and to determine a position of the position encoder 24 from the position signal time of flight $t_P$. The process unit 42 is further configured to determine a deviation between the first reference signal tie of flight $t_{R1}$ and the second reference signal time of flight $t_{R2}$.

The results of the processor unit can be supplied to a further processing via an interface 46 of the evaluation unit 12, for example to a display of the position of the position encoder 24 or the output of a warning if the deviation between the first reference signal time of flight $t_{R1}$ and the second reference signal time of flight $t_{R2}$ exceeds a predefined threshold value.

Figure 2:
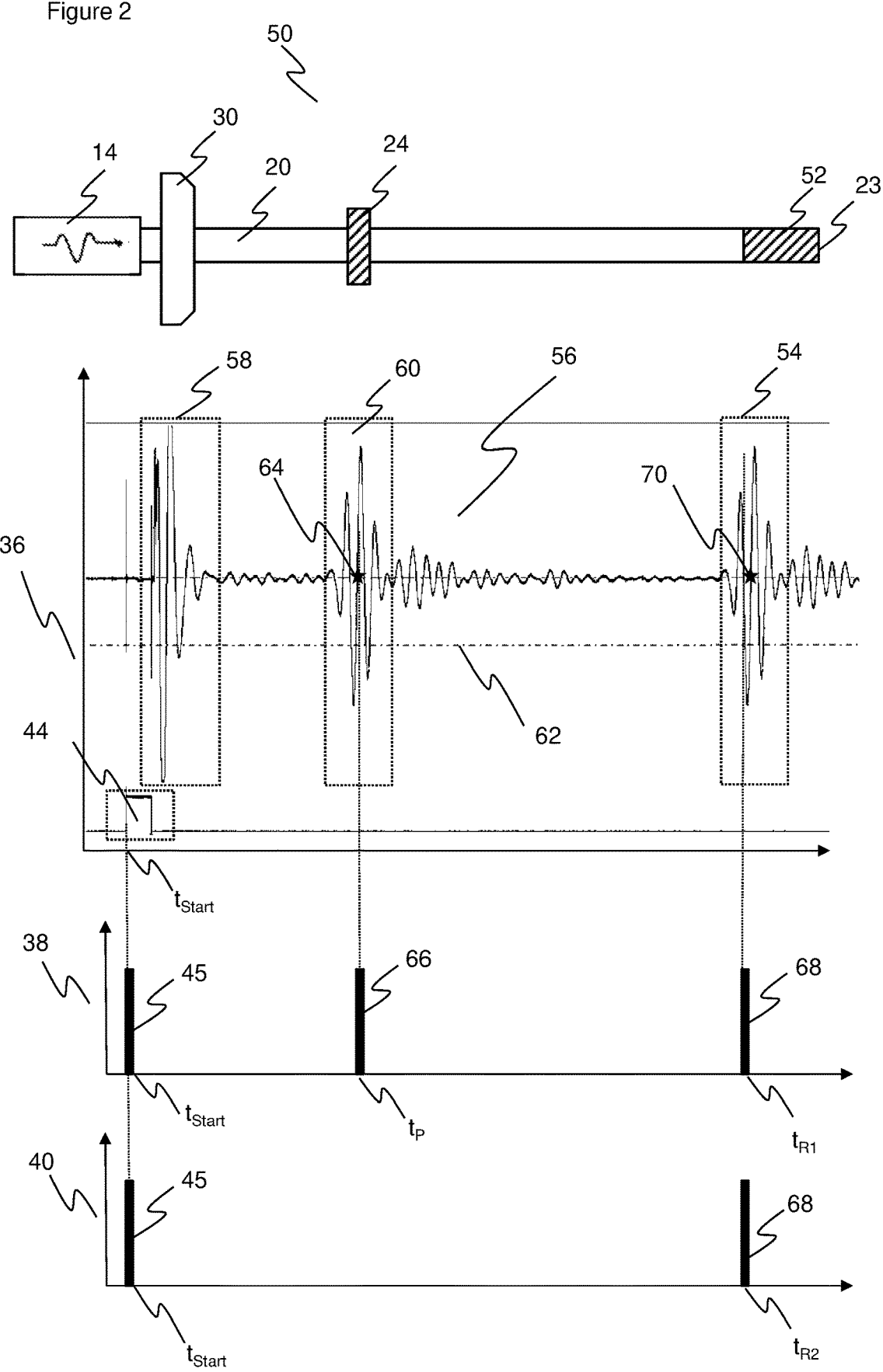
FIG. 2 an exemplary measurement signal and measurement signal processing of a first embodiment of a magnetostrictive displacement sensor in accordance with the invention.

FIG. 2 shows an exemplary measurement signal 56 and a measurement signal processing of a first embodiment of a magnetostrictive displacement sensor 50 in accordance with the invention in which a reflector 52 generates a reference signal 54 at the second end 23 of the magnetostrictive device component 20. The measurement signal 56 generated by the transducer 30 here comprises a coupling signal 58, a position signal 60, and the reference signal 54 generated by the reflector 52. A trigger signal 44 represents the time of the emission of the current pulse 14 to the magnetostrictive device component 20.

On a digitization of the measurement signal 56, the trigger signal 44 is transmitted to the first evaluation branch 38 as a start signal 45 for a first counter at the time $t_{Start}$. The coupling signal 58 of the measurement signal is blanked as an interference signal. If the position signal 60 falls below or exceeds a predefined signal threshold 62, the next zero crossing 64 (or the exceeding or falling below of a defined signal threshold value) of the position signal 60 is transmitted as a digital position signal 66 to the first evaluation branch 38 and the first evaluation branch 38 determines the signal time of flight $t_P$ of the position signal from the count of the first counter. The reference signal 54 generated by the reflector 52 is evaluated in the same manner and is transmitted as a digital reference signal 68 to the first evaluation branch 38 that determines the first reference signal time of flight $t_{R1}$ of the reference signal 54 from the count of the first counter.

The position signal time of flight $t_P$ of the position signal and the first reference signal time of flight $t_{R1}$ are then transferred to the processor unit 42 (not shown here).

The trigger signal 44 is transmitted to the second evaluation branch 40 as a start signal 45 for a second counter at the time $t_{Start}$ to monitor the signal processing in the first evaluation branch 38. The coupling signal 58 of the measurement signal 56 is blanked as an interference signal. The position signal 60 is equally blanked (so-called blanking) The measurement signal 56 is thus only evaluated in a time range in which the reference signal 54 is expected. If the reference signal 54 exceeds or falls below the predefined signal threshold 62, the next zero crossing 70 (or the exceeding or falling below of a defined signal threshold value) of the reference signal 54 is transmitted as a digital position signal 68 to the second evaluation branch 40 and the second evaluation branch 40 determines the second reference signal time of flight $t_{R2}$ of the reference signal 54 from the count of the second counter.

The second reference signal time of flight $t_{R2}$ is then transmitted to the processor unit 42 (not shown here) that is adapted, as explained in the description of FIG. 1, to determine a deviation of the first reference signal time of flight $t_{R1}$ and the second reference signal time of flight $t_{R2}$.

Figure 3:
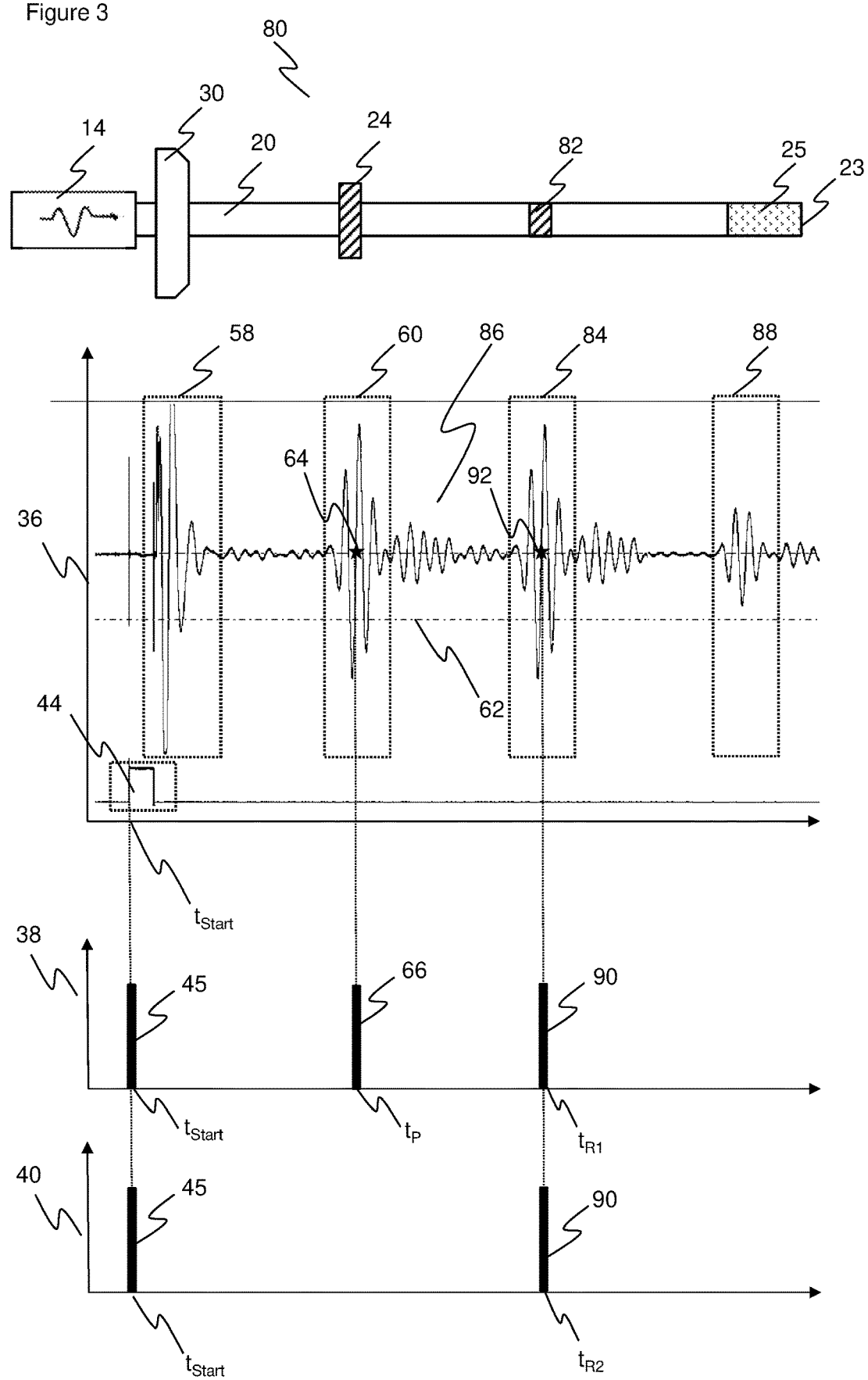
FIG. 3 an exemplary measurement signal and measurement signal processing of a second embodiment of a magnetostrictive displacement sensor in accordance with the invention.

FIG. 3 shows an exemplary measurement signal 86 and a measurement signal processing of a second embodiment of a magnetostrictive displacement sensor 80 in accordance with the invention. Unlike the embodiment described in FIG. 2, the magnetostrictive displacement sensor 80 has a reference magnet 82 that is arranged at a predefined position of the magnetostrictive device component 20. A damper unit 25 is arranged at the second end 23 of the magnetostrictive device component 20, as described in FIG. 1, to prevent or to reduce a reflection of the mechanical pulse 28 back into the magnetostrictive device component 20. The reference magnet 82 generates a reference signal 84 in the same manner as the position encoder 24 generates the position signal 60. The measurement signal generated by the transducer 30 thus comprises a coupling signal 58, a position signal 60, the reference signal 84 generated by the reference magnet 82, and a reflection signal 88 generated by the damping element 25. A trigger signal 44 represents the time of the emission of the current pulse 14 to the magnetostrictive device component 20.

On a digitization of the measurement signal 86, the trigger signal 44 is transmitted to the first evaluation branch 38 as a start signal 45 for a first counter at the time $t_{Start}$. The coupling signal 58 of the measurement signal 86 is blanked as an interference signal. If the position signal 60 exceeds or falls below a predefined signal threshold 62, the next zero crossing 64 (or the exceeding or falling below of a defined signal threshold value) of the position signal 60 is transmitted as a digital position signal 66 to the first evaluation branch 38 and the first evaluation branch 38 determines the signal time of flight $t_P$ of the position signal from the count of the first counter. The reference signal 84 generated by the reference magnet 82 is evaluated in the same manner and is transmitted as a digital reference signal 90 to the first evaluation branch 38 that determines the first reference signal time of flight $t_{R1}$ of the reference signal 84 from the count of the first counter. The reflection signal 88 of the damping element 25 does not exceed or fall below the predefined signal threshold 62 and is thus not detected and evaluated.

The position signal time of flight $t_P$ of the position signal and the first reference signal time of flight $t_{R1}$ are then transferred to the processor unit 42 (not shown here).

The trigger signal 44 is transmitted to the second evaluation branch 40 as a start signal 45 for a second counter at the time $t_{Start}$ to monitor the signal processing in the first evaluation branch 38. The coupling signal 58 of the measurement signal 56 is blanked as an interference signal. The position signal 60 is equally blanked (so-called blanking). The measurement signal 86 is thus only evaluated in a time range in which the reference signal 84 is expected. If the position signal 84 exceeds or falls below the predefined signal threshold 62, the next zero crossing 92 (or the exceeding or falling below of a defined signal threshold value) of the reference signal 84 is transmitted as a digital reference signal 90 to the second evaluation branch 40 and the second evaluation branch 40 determines the second reference signal time of flight $t_{R2}$ of the reference signal 84 from the count of the second counter.

The second reference signal time of flight $t_{R2}$ is then transmitted to the processor unit 42 (not shown here) that is adapted, as explained in the description of FIG. 1, to determine a deviation between the first reference signal time of flight $t_{R1}$ and the second reference signal time of flight $t_{R2}$.

Figure 4:
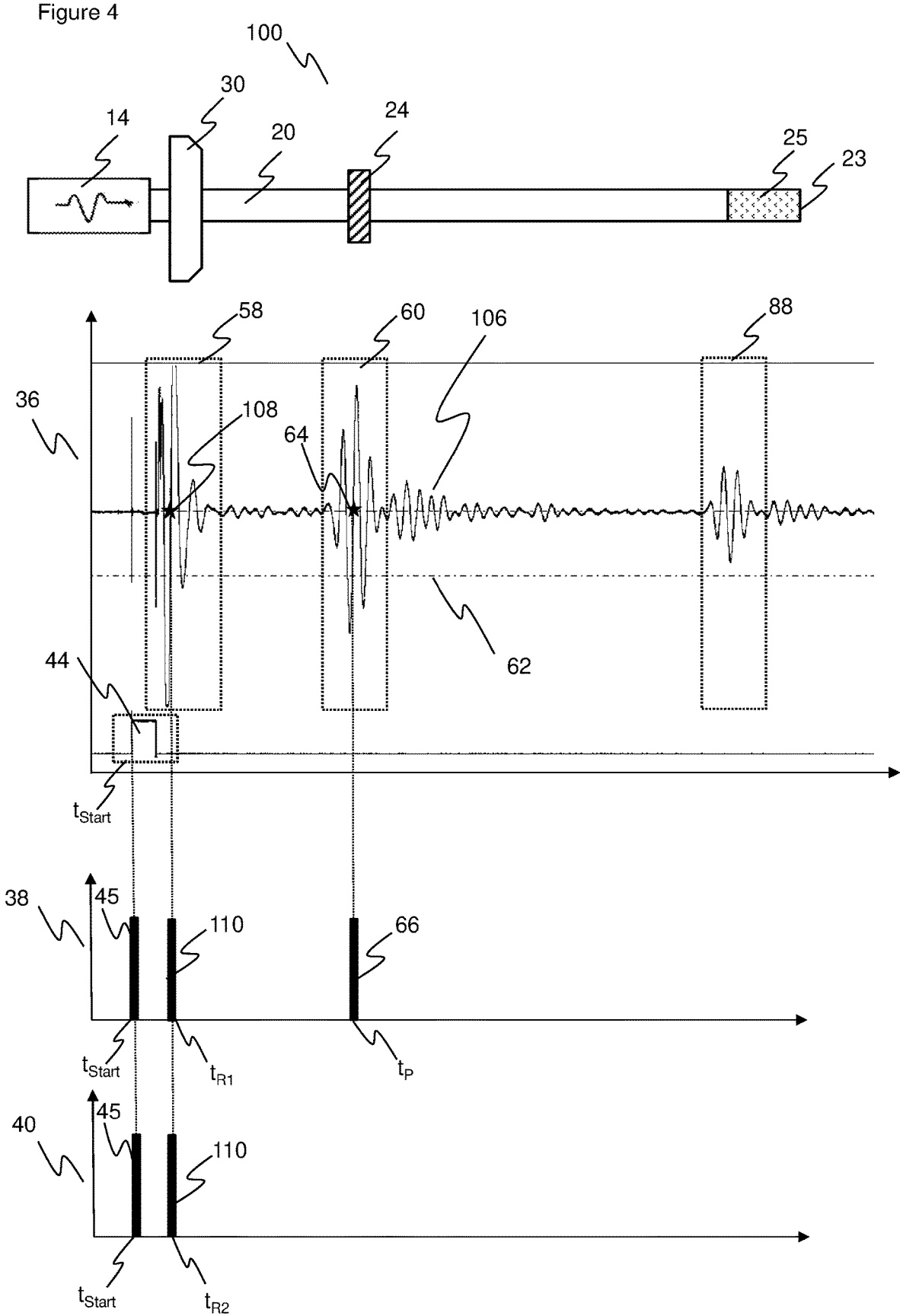
FIG. 4 an exemplary measurement signal and measurement signal processing of a third embodiment of a magnetostrictive displacement sensor in accordance with the invention.

FIG. 4 shows an exemplary measurement signal 106 and a measurement signal processing of a third embodiment of a magnetostrictive displacement sensor 100 in accordance with the invention. Unlike the embodiments described in FIGS. 2 and 3, the magnetostrictive displacement sensor 100 uses the coupling signal 58 as the reference signal that is generated in the transducer 30 by the radial magnetic field 22 induced by the current pulse 14 in the magnetostrictive device component 20. No reference magnet is thus provided and a damper unit 25 is arranged at the second end 23 of the magnetostrictive device component 20, as described in FIGS. 1 and 3, to prevent or to reduce a reflection of the mechanical pulse 28 back into the magnetostrictive device component 20.

The measurement signal 106 generated by the transducer 30 thus comprises a coupling signal 58, a position signal 60, and a reference signal 88 generated by the damping element 25. A trigger signal 44 represents the time of the emission of the current pulse 14 to the magnetostrictive device component 20.

On a digitization of the measurement signal 106, the trigger signal 44 is transmitted to the first evaluation branch 38 as a start signal 45 for a first counter at the time $t_{Start}$. If the coupling signal 58 of the measurement signal 106 exceeds or falls below a predefined signal threshold 62 the next zero crossing 108 (or the exceeding or falling below of a defined signal threshold value) of the coupling signal 58 is transmitted as a digital reference signal 110 to the first evaluation branch 38 and the first evaluation branch 38 determines the first reference signal time of flight $t_{R1}$ from the count of the first counter. If the position signal 60 exceeds or falls below a predefined signal threshold 62, the next zero crossing 64 (or the exceeding or falling below of a defined signal threshold value) of the position signal 60 is transmitted as a digital position signal 66 to the first evaluation branch 38 and the first evaluation branch 38 determines the signal time of flight $t_P$ of the position signal from the count of the first counter. The reflection signal 88 of the damping element 25 does not exceed or fall below the predefined signal threshold 62 and is thus not detected and evaluated.

The signal time of flight $t_P$ of the position signal and the first reference signal time of flight $t_{R1}$ are then transferred to the processor unit 42 (not shown here).

The trigger signal 44 is transmitted to the second evaluation branch 40 as a start signal 45 for a second counter at the time $t_{Start}$ to monitor the signal processing in the first evaluation branch 38. If the coupling signal 58 of the measurement signal 106 exceeds or falls below a predefined signal threshold 62, the next zero crossing 108 (or the exceeding or falling below of a defined signal threshold value) of the coupling signal 58 is transmitted as a digital reference signal 110 to the second evaluation branch 40 and the second evaluation branch 40 determines the second reference signal time of flight $t_{R2}$ from the count of the second counter.

The second reference signal time of flight $t_{R2}$ is then transmitted to the processor unit 42 (not shown here) that is adapted, as explained in the description of FIG. 1, to determine a deviation between the first reference signal time of flight $t_{R1}$ and the second reference signal time of flight $t_{R2}$.

The signal processing in the embodiments was described while using a digitizing of the measurement signals; it is obvious to the skilled person that a partial or purely analog processing of the measurement signals is also possible.

The invention claimed is:

1. An evaluation unit for a magnetostrictive displacement sensor for determining a position of at least one position encoder, the evaluation unit having:
   an input for receiving an electrical measurement signal generated by the magnetostrictive displacement sensor, wherein the electrical measurement signal comprises a position signal representing a position of a position encoder movable relative to a magnetostrictive device component and a reference signal representing a reference position, a first evaluation branch for evaluating the measurement signal, wherein the first evaluation branch is adapted to determine a position signal time of flight of the position signal and a first reference signal time of flight of the reference signal, and a processor unit that is adapted to determine the position of the position encoder from the position signal time of flight, wherein the evaluation unit has a second evaluation branch that is adapted to determine a second reference signal time of flight of the reference signal, and wherein the processor unit is adapted to determine a deviation of the first reference signal time of flight from the second reference signal time of flight.

2. The evaluation unit in accordance with claim 1, wherein the processor unit is adapted to output an error signal on the basis of the deviation of the first reference signal time of flight from the second reference signal time of flight.

3. The evaluation unit in accordance with claim 1, wherein the processor unit is adapted to determine the position of the position encoder while considering the first reference signal time of flight and/or the second reference signal time of flight.

4. The evaluation unit in accordance with claim 1, wherein at least one of the first evaluation branch and the second evaluation branch is adapted to determine the signal times of flight while using a trigger signal of a pulse transmitter of the magnetostrictive displacement sensor that is adapted to emit at least one current pulse to a first end of the magnetostrictive device component.

5. The evaluation unit in accordance with claim 1, wherein the evaluation unit has at least one digitizing unit for digitizing the measurement signal.

6. The evaluation unit in accordance with claim 5, wherein a common digitizing unit is connected upstream of the first evaluation branch and the second evaluation branch.

7. The evaluation unit in accordance with claim 5, wherein a first digitizing unit is connected upstream of the first evaluation branch and a second digitizing unit is connected upstream of the second evaluation branch.

8. The evaluation unit in accordance with claim 1, wherein the second evaluation branch is adapted to determine a deviation of the second reference signal time of flight from a predefined desired signal time of flight and to output an error code on the basis of the deviation of the second reference signal time of flight from the desired signal time of flight.

9. The evaluation unit in accordance with claim 1, wherein the second evaluation branch has an interface that is adapted to forward the second reference signal time of flight and/or an error code to an external receiver.

10. A magnetostrictive displacement sensor for determining a position of at least one position encoder having
a magnetostrictive device component that extends along a measurement path and is configured to conduct mechanical pulses triggered by magnetostriction;

a transducer arranged in the region of a first end of the magnetostrictive device component for the detection of mechanical pulses propagating in the magnetostrictive device component and for converting the mechanical pulses into an electrical measurement signal, a pulse transmitter for emitting at least one current pulse to the first end of the magnetostrictive device component for the induction of a first radial magnetic field around the magnetostrictive device component, at least ones position encoder movable relative to the magnetostrictive device component for triggering a first mechanical pulse in the magnetostrictive device component, wherein the magnetostrictive displacement sensor has an evaluation unit in accordance with claim 1.

11. The magnetostrictive displacement sensor in accordance with claim 10, wherein the reference signal is generated by a reflection of the first mechanical pulse at a second end of the magnetostrictive device component.

12. The magnetostrictive displacement sensor in accordance with claim 10, wherein the reference signal is generated by a second mechanical pulse triggered by a reference magnet arranged at a predefined distance from the first end of the magnetostrictive device component.

13. The magnetostrictive displacement sensor in accordance with claim 10, wherein the reference signal is generated in the transducer by the magnetic field induced by the current pulse.

14. A method of determining a position of at least one position encoder of a magnetostrictive displacement sensor having an evaluation unit, said method comprising the steps
receiving an electrical measurement signal generated by the magnetostrictive displacement sensor in the evaluation unit, wherein the electrical measurement signal comprises a position signal representing a position of a position encoder movable relative to a magnetostrictive device component and a reference signal representing a reference position, determining a position signal time of flight of the position signal and a first reference signal time of flight of the reference signal in a first evaluation branch of the evaluation unit, determining the position of the position encoder from the position signal time of flight, determining a second reference signal time of flight of the reference signal in a second evaluation branch of the evaluation unit, and determining a deviation of the first reference signal time of flight from the second reference signal time of flight.

\* \* \* \* \*

UNITED STATES PATENT AND TRADEMARK OFFICE
CERTIFICATE OF CORRECTION

PATENT NO. : 11,713,981 B2
APPLICATION NO. : 17/506763
DATED : August 1, 2023
INVENTOR(S) : Saiful Islam Ahmad It is certified that error appears in the above-identified patent and that said Letters Patent is hereby corrected as shown below:

In the Claims

Claim 10, Column 10, Line 15, please delete the phrase "at least ones position encoder" and replace with "at least one position encoder".

Signed and Sealed this
Nineteenth Day of September, 2023

Katherine Kelly Vidal
*Director of the United States Patent and Trademark Office*